July 9, 1940.　　　　A. F. SHIELDS　　　　2,207,073
INFINITE VARIABE SPEED TRANSMISSION
Filed May 6, 1937　　　2 Sheets-Sheet 2

INVENTOR
Albert F. Shields.
BY
ATTORNEY

Patented July 9, 1940

2,207,073

UNITED STATES PATENT OFFICE 2,207,073

INFINITE VARIABLE SPEED TRANSMISSION

Albert F. Shields, Jamaica, N. Y.

Application May 6, 1937, Serial No. 141,062

9 Claims. (Cl. 74—230.17)

This invention relates to a variable speed transmission for transmitting power by an infinite number of adjustments without steps or any limited number of variations. In motor drives, most of the power lines are of alternating current source and therefore the motors are generally of an inductive type with a fixed speed that cannot be varied easily. In adapting these constant speed motors to machine tool drives in particular, and to all kinds of machinery wherein it is desired to vary the speed in order to obtain best results, some form of transmission must be used aside from the control of the motor. This invention contemplates the use of belts preferably of the V-type, which run in grooved pulleys and which give a maximum amount of driving engagement. Furthermore, the invention contemplates the use of the expansible type of pulleys wherein a set of fingers on the one half of the pulley enter into slots in the other half of the pulley, permitting the pulley to expand or contract, thereby decreasing or increasing its effective diameter respectively. This type of pulley is old in the art and is completely shown in Patent No. 179,746, to Wales. In this form of construction as shown in Wales, the expansion of one pulley thereby reducing its effective diameter is through a lever mechanism effective in closing the other pulley, thereby increasing its effective diameter. Inasmuch as one expands in definite proportion to the contraction of the other one, approximately the same length of belt is maintained, but a different speed ratio results. Inasmuch as the pulleys are of the V-type, the same angle for engagement of the edge of the V-type belt is maintained, no matter to what extent the pulley is closed or opened.

This invention contemplates the use of this pulley system with its V-belt for driving two parallel axes, but in addition thereto, uses a duplicate set mounted on the same shaft but so controlled as to act oppositely from the first pair. Obviously by opening or closing the double set of drives, each with its own V-type belt, an infinite adjustment of speed can be obtained. It is this arrangement of two belts operating on expansible pulleys which is the principal feature of this invention. The means to control the opening and closing of the pulleys is another feature of the invention. Furthermore, the control apparatus as well as the motor and the drive of the work shaft is so arranged as to make the entire unit compact, self-contained, and into a most useful device for adapting constant speed motors to the drives of the machinery wherein adjustment of the speed is required. Furthermore, the entire unit has been equipped with bearings for properly supporting the shafts and gears have been introduced to complete the unit into a perfectly controlled device.

Another feature of the device is the manual control of the speed ratio between the constant speed motor and the driven shaft which when once set, will stand at its fixed position, this being accomplished through a gear and screw arrangement which moves two of the pulley flanges to a closed and opened position.

Another feature is a graduated indicating dial which shows the speed of the driven shaft, and reads directly in terms of revolutions.

Another feature is the method of maintaining the belts in a tightened position which contemplates the use of a rocker arm which is moved and retained by a tension spring which is adjustably mounted.

The pulleys are so mounted that completely joined V-belts can be placed or removed from the pulleys without dismantling any part of the machine. In Figure 1 it will be noted that the pair of pulleys connecting to the driving and the driven shafts are separated from each other by a space between their two adjacent flanges, and this space is wide enough to insert or remove a belt. The jackshaft with its two pulleys is mounted in a yoke which is suspended within the frame on a pivot, and is so designed that the belts can be put over the yoke and onto the pulley without taking apart any part of the machine. In Figure 2 a cover plate 8a is shown which can be removed for handling the belts. With this plate removed, an operator can insert his hand into the machine and put the belts onto the pulleys, or remove them. The jackshaft mounted in a bracket with a spring tensioning device for holding the belts tight likewise is a great convenience in handling the belts, as the tension can be removed and the bracket will drop down to a position which allows sufficient room to place the belts over the flanges.

It so happens that the belts would be actually tighter when the pulleys are offset, but this is made uniform by the spring adjustment which moves the jackshaft and its two pulleys as a whole.

When the device is to be used for the transmission of considerable power, it is sometimes desirable to use multiple belts which give a smoother action than a single belt which would have to be rather heavy and bulky to transmit a large amount of power.

In this instance, it is contemplated to use several smaller belts for each of the drives, and to construct the pulleys with multiple flanges, which carry out exactly the same action as disclosed for the single type pulley. Smaller belts are more uniform and when used in multiple, form a more flexible connection which will cling to the pulleys better than a heavy belt, which on account of its own weight, becomes stiff and unwieldly.

These features, in addition to the details of construction which are very important in a unit of this type, are all a part of this invention, and for a detailed description, reference is made to the accompanying drawings, in which.

Similar reference numerals refer to similar parts throughout the drawings.

Figure 1:
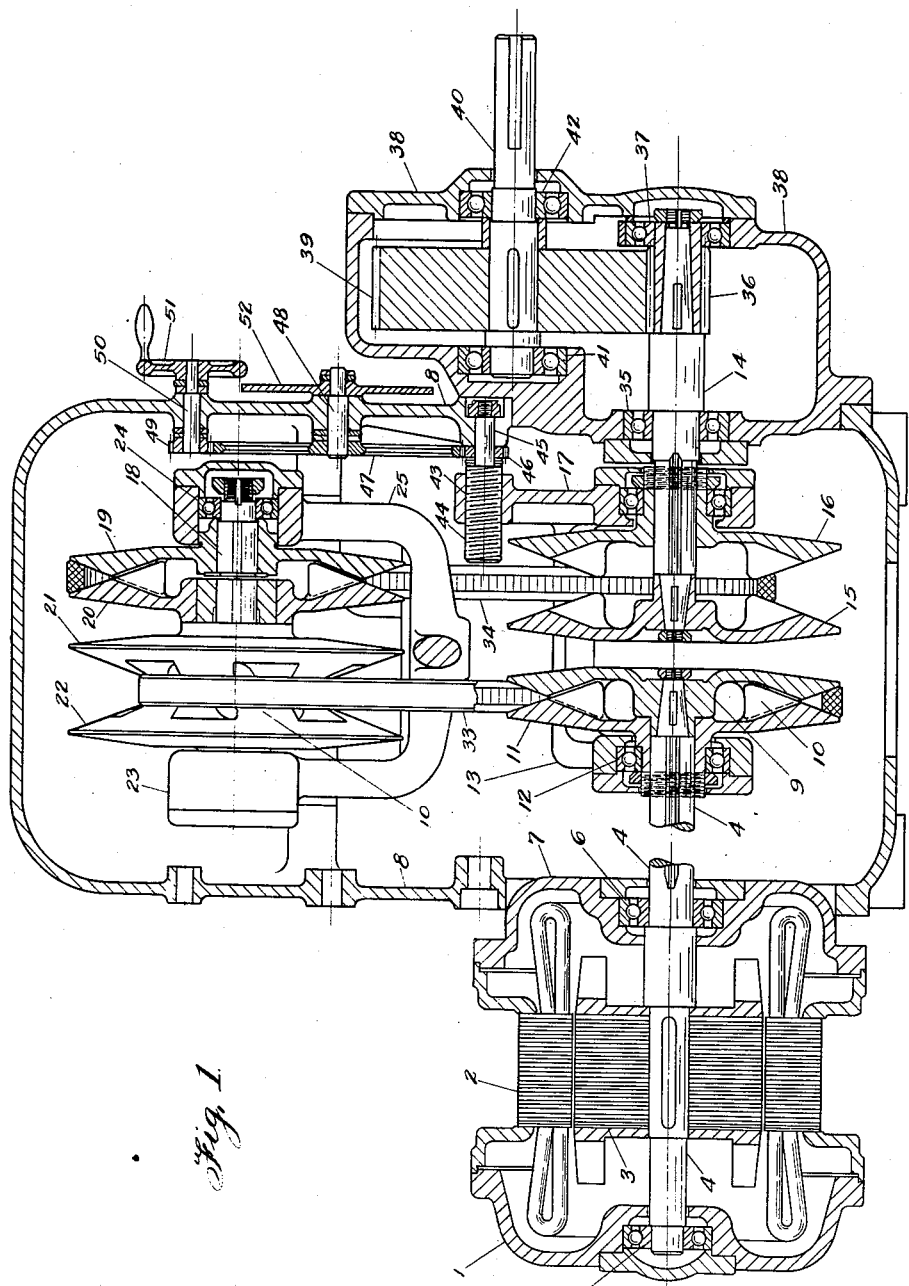
Figure 1 is an elevation partly in section of the unit and shows the drive belts in one of the particular settings.
Figure 2:
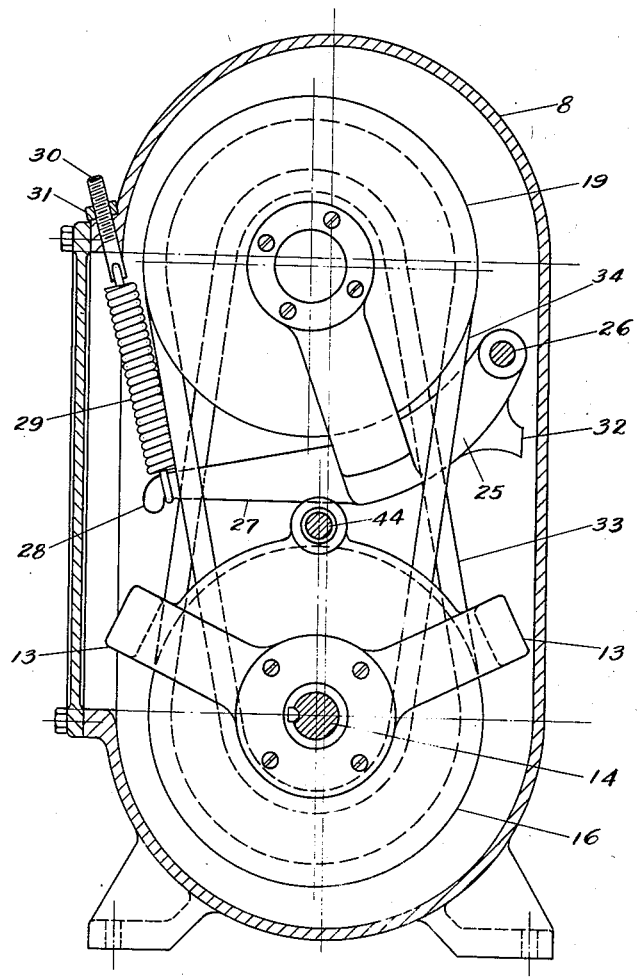
Figure 2 is an end elevation partly in section, showing the means of tensioning the belts.
Figure 3:
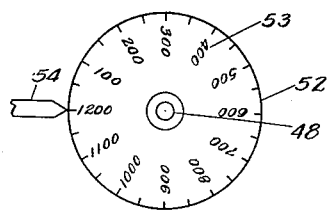
Figure 3 is an end elevation, showing the direct reading speed indicating dial.

1 is a motor in which is mounted a stator 2 and a rotor 3 and shaft 4. The shaft rotates in bearings 5 and 6, mounted in frame 7. This motor is bolted to a frame 8 which is adapted to receive the transmission pulleys. The housing of the drive shown in Figure 1 is made with duplicate bosses on each end, so that it may be assembled either right hand or left hand, dependent upon the applications to the machine to be driven. With this arrangement, it is obvious that shafts 45, 48, and 50 may be assembled in either end of the housing, and the gear reduction box 38, as well as the motor 2, may be reversed and assembled on either end of the housing. The shaft 4 of the motor projects into the frame and attaches to one of the pulley flanges 9. This flange has the usual bevelled side wall of an angle to match the bevel of the V-belt, and formed on this angle side are fingers 10, which are really continuations of the angle, and are produced by alternating fingers and slots. The other flange 11 of the pulley is a duplicate, and interlocks expansively with the first flange. This flange is mounted to rotate in a bearing 12, which is set into yoke 13. As before mentioned, the details of this pulley are fully disclosed in Patent No. 179,746, to Wales, and is old in the art. The first flange 9 is rigidly attached to the motor shaft, and stands in one position, free to rotate only. This flange rotates with the same speed as the motor. The other flange of the pulley is free to move axially along a shaft 4. Adjacent to this, and attached to the shaft 14, is another flanged expansible pulley, exactly similar to the one pulley described. The flange 15 of this pulley is keyed and rigidly attached to the shaft 14, and opposite this flange is its mating flange 16, which can be shifted axially and is controlled by an arm 17, which acts as a bearing and a shifter combined. This arm 17 is formed integrally with bracket 13. Opposite this pair of expansible pulleys is another pair which are mounted on shaft 18. In this instance, a flange 19 is rigidly attached to the shaft. Co-acting with this flange 19 is its mating flange 20, which is axially movable on the shaft. Adjoining this flange 20, and mounted on the same shaft, is another flange 21, axially movable on the shaft, and its co-acting flange 22 is rigidly attached to the shaft. This shaft is mounted in bearings 23 and 24. The two bearings are mounted in a yoke type frame 25, which has a pivot pin 26, and a lever 27, terminating in a notched end 28. This is for the purpose of tightening the belt. The rocking of the shaft with its two expansible pulleys about the pivot, causes a tightening of both belts against the pulleys. The tightening is actually accomplished by a spring 29, which is of the helical expansive type. The one end of the spring is looped to the bracket, the other end to a screw stud 30 which projects through the frame of the unit and is adjusted by a nut 31. In order that the shaft shall not drop down beyond a set point, should the spring be released, a stop 32 is provided as a part of the lever, and is adapted to engage the frame of the unit. It will be seen from Figure 1 that a V-belt 33 runs in the first pair of expansible pulleys, and transmits the power from the motor to the jackshaft, and a second V-belt 34 engaging the second expansible pulley on the jackshaft drives back again to transmit the power to the expansible pulley attached to shaft 14, and shaft 14 projects through the casing and bearing 35, to provide a support for pinion 36, which is keyed to the shaft, and terminates in a bearing 37, mounted in the casing 38. This pinion engages a gear 39 which is mounted on shaft 40, which in turn is mounted in bearings 41 and 42. These bearings are supported in the gear box 38. This shaft projects outward and forms the driving member. In order to change the speed of the device, a shifter 17 is provided. The flange 16 is rotatably supported on this shifter 17. This shifter has a tapped hole 43 which receives a screw thread 44 which is formed on the end of a short shaft 45, which is journaled in a bearing in the housing 8. Mounted on this shaft 45 is a pinion 46 which is rotated by a larger gear 47, mounted on an axle 48 which is journaled in the casing 8. The gear 47 is driven by a pinion 49 which is mounted on a journal 50 which is supported in the frame 8. This journal 50 extends through the casing and has hand wheel 51 mounted on its extremity. On the outward end of the journal 48 is mounted a direct reading dial 52 which has graduations 53 which indicate directly the speed of the driven shaft 40. An indicator 54 is attached at any convenient place on the casing 8, to cooperate with the readings on the dial 52. It is by the use of this mechanism that the operator turns the hand wheel 51 to effect a movement of the bracket 17 back and forth on the screw 44. It should be kept in mind that the bracket 17 is rigidly attached and forms part of the supporting yoke 13, which carries the pulleys from the motor and the last pulley in the series mounted on the shaft 14. When the bracket 17 is moved by the screw 44, the flange 16 is either moved toward the flange 15, or away from it, and the belt is forced to assume a new position at a new effective diameter on the pulley. If these flanges open, the flanges 9 and 11 close, and the belts follow to new positions, which causes flanges on the jackshaft pulleys to follow and close against the belt. This action causes the other pulleys on the jackshaft to operate, and immediately compensate for the change in the other pulley. In other words, the movement of the one pair of pulleys immediately causes the movement of the other pair on the jackshaft, and between this double shaft an infinite variation of the speed may be obtained.

In operation, the problem consists in the provision of a constant speed shaft usually in the form of a shaft from an induction motor and the transmission of the power delivered by this motor shaft to a driving shaft for the machinery which must be driven at a variable speed, dependent upon the requirement of the machine to be driven. In accordance with the design disclosed in this invention, a pair of self-compensating belts are used to connect the motor shaft with the driven shaft and preferably through a jackshaft which is offset from the center line of the motor and the driven shaft. The belts to be used are preferably of the V-type which permit the use of expansible pulleys of the V-type. A V-belt drive from the expansible pulley mounted on the motor shaft to an expansible pulley mounted on the jackshaft changes the relative speed of the jackshaft to that of the motor, when the effective diameter of either pulley is altered. That is, when the effective diameter of the expansible pulley on the motor shaft or the effective diameter of the pulley on the jackshaft in which the same belt runs is proportionately changed, the speed is changed.

Mounted on the jackshaft is an additional expansible pulley which carries the second belt, the belt then in turn connecting to an expansible pulley attached to the shaft to be driven. In other words, we have three shafts connected together by two V-belts, through a system of expansible pulleys. By changing the effective diameters of these expansible pulleys, the speed ratio between the motor shaft and the driven shaft is varied infinitely within the limits of the machine.

In order to effect a change, a mechanism is provided which moves the yoke carrying the last flange of the expansible pulley attached to the driven shaft and the floating flange of the motor pulley, and this movement causes a movement throughout the entire set of pulleys. This action occurs due to a closing or opening of the pulley flanges on the driving and driven shafts, which changes the effective diameters of the pulleys on these shafts, which in turn acts to change the center distance between the driven shaft and the jackshaft which may set up an extra tension against the spring supporting the bracket in which the jackshaft is mounted. This extra tension immediately causes the jackshaft to attempt to re-adjust itself again to an equalized and stable center distance. If the pulley on the driven shaft is closed so as to increase its effective diameter, it will pull the belt tighter, and for an instant it will pull the jackshaft toward it, which will cause the flange of the co-acting pulley on the jackshaft to be pushed open, thereby reducing the effective diameter of the pulley on the jackshaft. When this occurs, the adjoining flange of the other adjustable pulley mounted on the jackshaft will be pushed in the same direction as they are joined together, and thereby increase the effective diameter of the second adjustable pulley. This increase in the effective diameter tightens the belt connecting this pulley with the motor pulley which causes the motor pulley to open and reduce its effective diameter. Thus the one belt in adjusting itself carries the adjustment of the other belt with it. This arrangement results in an equalized position at which both belts are under the same spring tension. This spring is the tensioning device and moves the jackshaft with its two adjustable pulleys all at one time. In order to make the unit complete, it is mounted in a suitable case and a hand wheel control is provided so as to make the necessary adjustments. It will be noted that an infinite adjustment in speed can be made within the limits of the machine. Furthermore, to inform the operator as to just what speed he is obtaining on his driven shaft, a graduated dial has been provided which is connected to the adjusting mechanism.

It should be pointed out that when an adjustment is being made, the first action is to change the effective diameters of the pulleys on the driving and driven shafts. This is accomplished by opening one of the pulleys and closing the other. This change in the effective pulley diameters immediately causes a change in the tension of the belts, and this change in the tensioning of the belts immediately causes the movements of the pulley flanges on the jackshaft, and the entire drive settles down to a new adjustment, in a position in which the tension is equalized on both belts.

Having described my invention, what I claim as new and desire to secure by Letters Patent, is:

1. In a variable speed transmission, a frame, a driving shaft of substantially constant speed, an adjustable V-type pulley mounted on said shaft, a jackshaft offset from the said driving shaft and a bracket hinged to the frame and supporting said jackshaft, a pair of adjustable V-type pulleys mounted on said jackshaft, a driven shaft offset from the jackshaft and in the same direction therefrom as the driving shaft, an adjustable V-type pulley mounted on said driven shaft; a flexible V-type belt engaging a pulley on the driving shaft and one of the pulleys on the jackshaft, another flexible V-type belt engaging the other pulley on the jackshaft and the pulley on the driven shaft, and resilient belt tensioning means operable with said hinged bracket to move said bracket away from said driving and driven shafts.

2. In a variable speed transmission, a frame, a driving shaft of substantially constant speed, an adjustable V-type pulley mounted on said shaft, a jackshaft offset from the said driving shaft and a bracket hinged to the frame and supporting said jackshaft, belt tensioning means operable with said hinged bracket; to move said bracket away from said driving and driven shafts, a pair of adjustable V-type pulleys mounted on said jackshaft, a driven shaft offset from the jackshaft in the same direction therefrom as the driving shaft, an adjustable V-type pulley mounted on the driven shaft, a flexible V-type belt engaging a pulley on the driving shaft and one of the pulleys on the jackshaft; another flexible V-type belt engaging the other pulley on the jackshaft and the pulley on the driven shaft, and means to change the effective diameters of the pulleys.

3. In a variable speed transmission, a frame, a driving shaft of substantially constant speed, an adjustable V-type pulley mounted on said shaft, a jackshaft offset from the said driving shaft and a bracket hinged to the frame and supporting said jackshaft, belt tensioning means operable with said hinged bracket, to move said bracket away from said driving and driven shafts, a pair of adjustable V-type pulleys mounted on said jackshaft, a driven shaft offset from the jackshaft in the same direction as the driving shaft, an adjustable V-type pulley mounted on the driven shaft, a flexible V-type belt engaging a pulley on the driving shaft and one of the pulleys on the jackshaft, another flexible V-type belt engaging the other pulley on the jackshaft and the pulley on the driven shaft, means to change the effective diameters of the pulleys, and means to directly indicate the speed of the driven shaft.

4. In a variable speed transmission, a frame, a driving shaft of substantially constant speed, mounted in said frame, an adjustable V-type pulley mounted on the end of said shaft, a jackshaft offset but substantially parallel with said driving shaft and a bracket hinged to the frame and supporting said jackshaft, belt tensioning means operable with said hinged bracket, a pair of adjustable V-type pulleys each consisting of a fixed flange and a movable flange mounted on the said jackshaft, a driven shaft substantially co-axial with the said driving shaft, but with its end spaced therefrom, an adjustable V-type pulley mounted on the said driven shaft, a yoke connecting the movable flanges of the said driving and driven pulleys, means to axially move the said yoke, a flexible V-type belt engaging a pulley on the driving shaft and one of the pulleys on the jackshaft, another flexible V-type belt engaging the other pulley on the jackshaft, and the pulley on the driven shaft, and means to directly indicate the speed of the driven shaft.

5. In a variable speed transmission, a frame, a driving shaft of substantially constant speed mounted in said frame, an adjustable V-type pulley mounted on the end of said shaft, a jackshaft offset but substantially parallel with said driving shaft and a bracket hinged to the frame and supporting said jackshaft, adjustable resilient belt tensioning means operable with said hinged bracket, a pair of adjustable V-type pulleys each consisting of a fixed flange and a movable flange mounted on the said jackshaft, a driven shaft substantially coaxial with the said driving shaft, but with its end spaced therefrom, an adjustable V-type pulley mounted on the said driven shaft, a yoke connecting the movable flanges of the said driving and driven pulleys, means to axially move the said yoke, a flexible V-type belt engaging a pulley on the driving shaft and one of the pulleys on the jackshaft, another flexible V-type belt engaging the other pulley on the jackshaft and the pulley on the driven shaft, and means to directly indicate the speed of the driven shaft.

6. In a belted variable speed transmission, a frame, a driving shaft of substantially constant speed mounted within the said frame, an expansible V-type pulley mounted on the said shaft, a jackshaft offset from the said driving shaft and a bracket hinged to the frame and supporting said jackshaft from a position between the belts, a pair of expansible pulleys splined to the jackshaft, the pulleys so arranged that their adjacent flanges coact the one to the other, the movement of one increasing the effective diameter of one pulley and decreasing the effective diameter of the other pulley, a shaft to be driven at a variable speed mounted in the said frame and in the same general direction from the jackshaft as the driving shaft, an expansible pulley mounted on said shaft, a V-type belt connecting the driving pulley with one of the pulleys on the jackshaft, another V-belt connecting the other pulley on the jackshaft with the pulley on the driven shaft, and means to change the effective diameters of the said expansible pulleys.

7. In a variable speed transmission, a frame, a driving shaft of substantially constant speed mounted in the frame, an adjustable V-type pulley with a movable flange mounted on the end of said shaft, a jackshaft offset but substantially parallel with said driving shaft and a bracket hinged to the frame and supporting the said jackshaft, resilient belt tensioning means operable with said hinged bracket, a pair of adjustable V-type pulleys with movable flanges mounted on the said jackshaft, a driven shaft mounted in the frame substantially parallel to the said jackshaft, an adjustable V-type pulley with a movable flange mounted on the said driven shaft, a yoke connecting the movable flanges of the said driving and driven pulleys, means to axially move the said yoke, a flexible V-type belt engaging a pulley on the driving shaft and one of the pulleys on the jackshaft, another flexible V-type belt engaging the other pulley on the jackshaft and the pulley on the driven shaft.

8. In a variable speed transmission, a frame, a driving shaft of substantially constant speed and a driven shaft to be varied in speed mounted in the frame, an adjustable V-type pulley with movable flange mounted on the end of said driving shaft, a jackshaft offset but substantially parallel with said driving shaft a bracket hinged to the frame and supporting said jackshaft, belt tensioning means operable with said hinged bracket, a pair of adjustable V-type pulleys with movable flanges mounted on the said jackshaft, an adjustable V-type pulley with movable flange mounted on the said driven shaft, a yoke connecting the movable flanges of the said driving and driven pulleys, means to axially move the said yoke, a flexible V-type belt engaging a pulley on the driving shaft and one of the pulleys on the jackshaft, another flexible V-type belt engaging the other pulley on the jackshaft and the pulley on the driven shaft.

9. In a variable speed transmission, a frame, a driving shaft and a driven shaft mounted substantially on the same axis in the said frame but not connected to each other and with a substantial space left between the adjacent ends thereof, expansible V-type pulleys mounted on the said shafts at their adjacent ends, a jackshaft offset from the said driving and driven shafts, a pair of expansible V-type pulleys mounted on the said jackshaft, a hinged bracket rotatably supporting the said jackshaft with the pulleys mounted thereon mounted from a point on the frame, substantially midway between the two pulleys, a belt connecting the driving pulley with its respective co-acting pulley on the jackshaft, a belt connecting the driven pulley with its co-acting pulley on the jackshaft, and flexible means to move the hinged bracket in a direction to tension the belts.

ALBERT F. SHIELDS.